Nov. 9, 1971    R. B. NOCKLEBY    3,618,431
EASY GRIP TOOL

Filed June 25, 1970    3 Sheets-Sheet 1

INVENTOR.
Raymond B. Nockleby
BY
Attys

Nov. 9, 1971 R. B. NOCKLEBY 3,618,431
EASY GRIP TOOL
Filed June 25, 1970 3 Sheets-Sheet 2
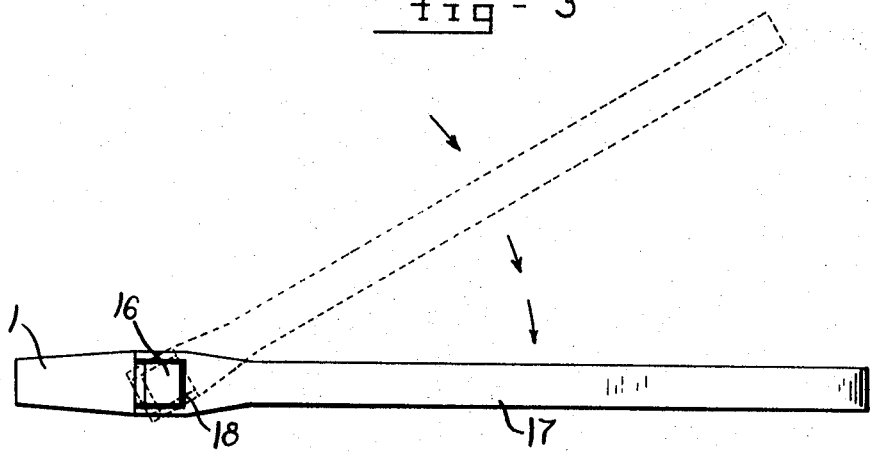
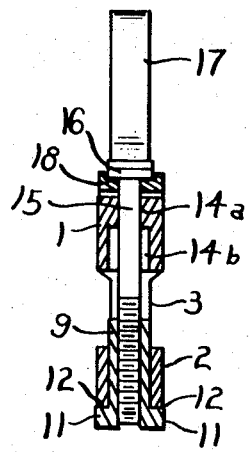
INVENTOR.
Raymond B. Nockleby
BY
Attys

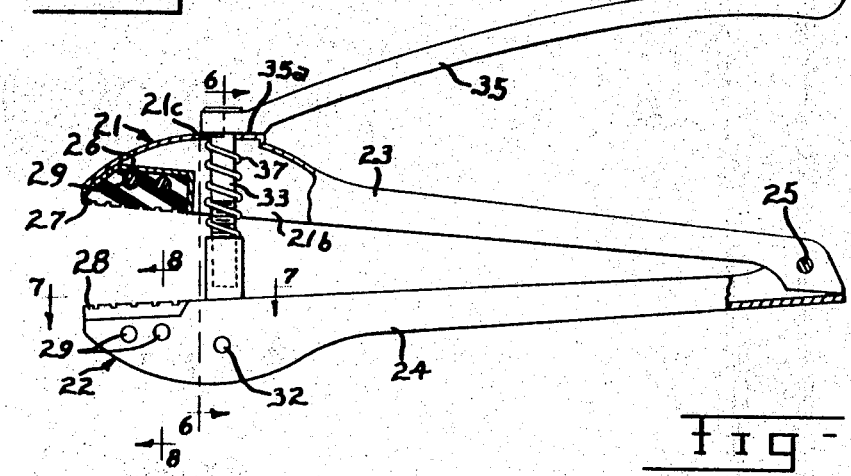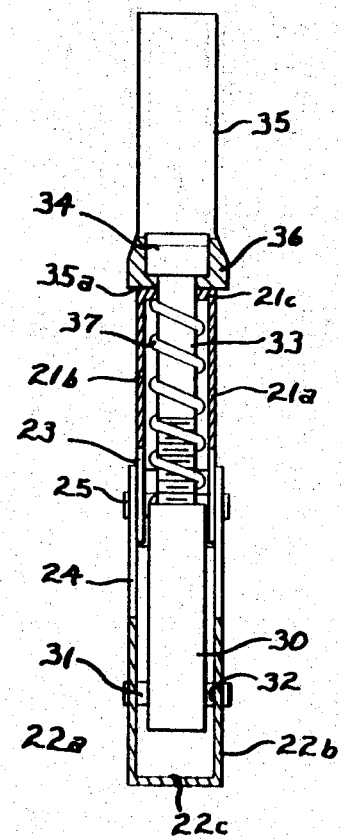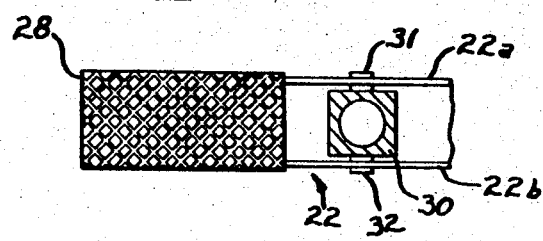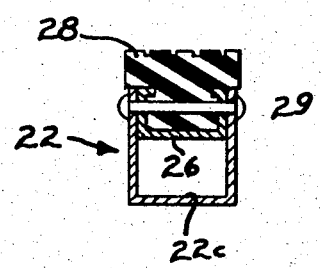

United States Patent Office 3,618,431
Patented Nov. 9, 1971

3,618,431
EASY GRIP TOOL
Raymond B. Nockleby, Rte. 1, Kalispell, Mont. 59901
Continuation-in-part of application Ser. No. 850,915,
Aug. 18, 1969. This application June 25, 1970, Ser.
No. 49,861
Int. Cl. B25b 7/04
U.S. Cl. 81—329                                  8 Claims

ABSTRACT OF THE DISCLOSURE

A hand tool usable to grip items firmly and further usable as a hand vise is made up of two gripping jaws having serrated faces opposing each other, the jaws having extensions thereon hinged to ech other at their ends remote from the jaws. The lower one of the jaws has a rectangular socket therein to receive an interiorly threaded sleeve which is pivoted to the lower jaw so that it can rock in the socket. A bolt with a rectangular head threads into the sleeve and extends through an aperture in the other jaw so that the rectangular head of the bolt is above that jaw. A handle fits on the bolt and has a rectangular seat therein to receive the bolt head and turn the bolt when the handle is turned. The jaws are urged apart by a known type of spring.

This application is a continuation-in-part of my application Ser. No. 850,915, filed Aug. 18, 1969, now abandoned for Easy Grip Tool.

BACKGROUND OF THE INVENTION

Many efforts have been made to produce a gripping tool usable to manually grip items so that they can be released merely by relaxing the manual grip and also usable as a simple hand vise. Examples of such devices are found in the following United States patents uncovered in a search made recently on this subject.

Evans, 3,259,965        Rulfe, 1,403,978
Lorey, 457,997          Burch, 1,647,340
Jensen, 639,812         Raimondi, 2,822,715
Okuno, 3,154,850        Ollagnon, 2,749,787
Whiting, 299,889

It is the purpose of the present invention to provide a simplified easy grip tool wherein the two known grip jaws are hinged to each other by extensions, and are normally urged away from each other by a known resilient member, with a means to force and hold the jaws together comprising an internally threaded sleeve, non-rotatably but rockably interposed in the jaws, a threaded bolt entering the sleeve and provided with a head, and a handle having an aperture at one end receiving the bolt and having a seat in said end non-rotatably receiving the bolt head, the handle having a jaw engaging surface beneath the seat which can be rotated on and rocked on the adjacent jaw surface to lift the bolt with respect to that jaw, the sleeve having means engaging the other jaw to move it with the sleeve and bolt toward the jaw engaged by the handle when the handle is aligned with and rocked toward the extensions.

This assembly effects the adjustment of the jaws toward each other by rotation of the handle about the axis of the bolt thus enabling the jaws to be forced against an item therebetween as in the vise. Further by rocking the handle toward the extensions it is caused to exert a tremendous leverage urging the jaws to grip an item therein.

The jaws in one form of the invention also have the serrations slanted thereon to enable the tool to grip a round smooth item in one direction and to slip on the round item in the other direction. The jaws in the other form of the invention have inserts of tough resilient material for gripping items without scarring their surfaces.

BRIEF DESCRIPTION OF THE DRAWINGS

FIG. 3 is a plan view of this form of the tool with a dotted line indication of a changed position of the handle;
FIG. 4 is a sectional view on the line 4—4 in FIG. 1;
FIG. 5 is a side view partly in section of a second form of the invention;
FIG. 6 is a sectional view on the line 6—6 of FIG. 5;
FIG. 7 is a sectional view on the line 7—7 of FIG. 5;
and
FIG. 8 is a sectional view on the line 8—8 of FIG. 5.

GENERAL DESCRIPTION

Figure 1:
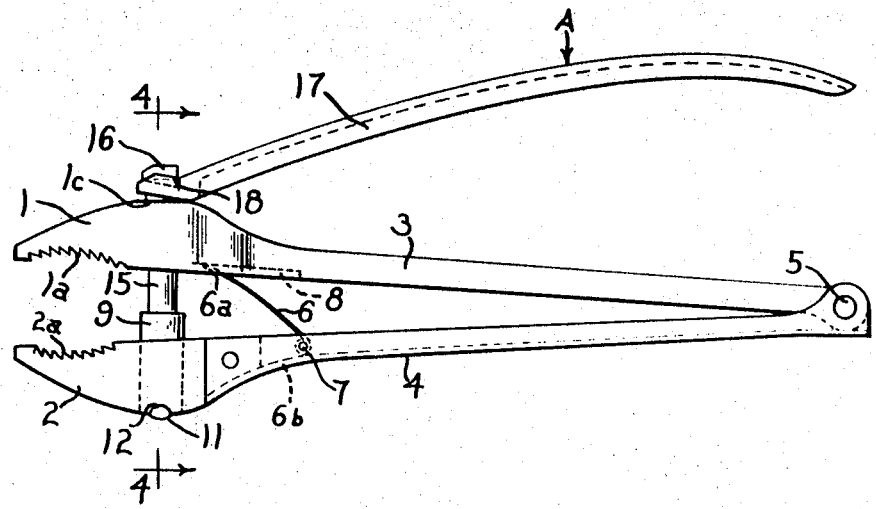
FIG. 1 is a side view of one form of the tool showing the jaws open.

The form of the tool shown in FIGS. 1–4 embodies two jaws 1 and 2. The jaw 1 has a narrowed extension 3 and the jaw 2 has a channel-shaped extension 4 fixed thereon. These extensions are pivoted together at their rear ends by a pivot pin 5. A spring 6 is mounted in the extension 4 and coiled on a pin 7. The spring 6 has one end 6a slidably seated in a recess 8 in the extension 3 and has its other end 6b seated in the extension 4. The spring 6 urges the jaws 1 and 2 away from each other.

The jaws 1 and 2 have serrated gripping faces 1a and 2a to grip articles. Note that the serrations 1a slant toward the extension 3 while the serrations 2a slant toward the free end of the jaw 2 so that these teeth may be gripped upon a smooth cylindrical surface to turn it in one direction and turned in the opposite direction like a pipe wrench upon a slight relaxation of the jaw pressure on the work.

Figure 2:
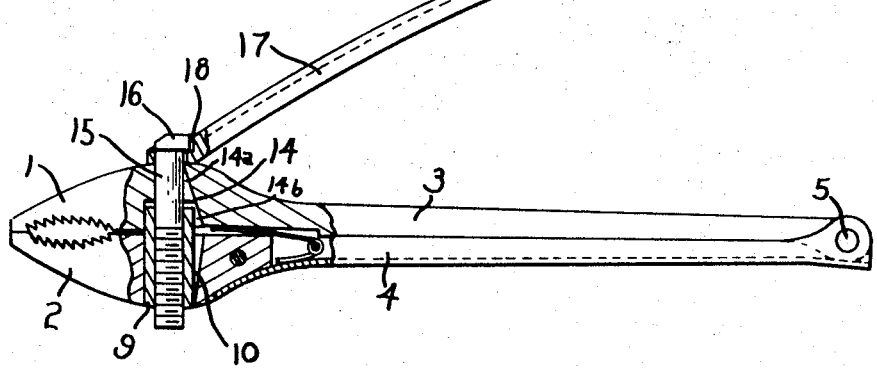
FIG. 2 is another side view of this form of the tool partly in section showing the jaws closed to the limit.

To secure and bring the jaws 1 and 2 toward each other, a sleeve 9, of rectangular exterior configuration and interiorly threaded, is provided. This sleeve 9 fits in a rectangular aperture 10 of the jaw 2 which aperture 10 increases in size lengthwise of the jaw 2 toward the other jaw as indicated in FIG. 2 so that the sleeve 9 can rock a limited amount in the aperture 10. Two trunnions 11 are provided on the sleeve 9 and they seat in recesses 12 formed in the jaw 2. The rocking movement just referred to turns the trunnions 11 slightly in the recesses 12. The jaw 1 has an aperture 14 therein to receive a threaded bolt 15 that has threads to match the threaded interior of the sleeve 9. The aperture 14 has a narrow portion 14a extending in from the curved outer top surface of the jaw 1. This portion 14a extends to an enlarged portion 14b of the aperture 14 which enlarged portion is rectangular in cross section. Both portions 14a and 14b increase in size lengthwise of the jaw 1 toward the jaw 2 so that the bolt 15 and the sleeve 9 can rock slightly with respect to the jaw 1. The enlarged portion 14b of the aperture 14 receives the upper end of the sleeve 9 when the jaws are drawn toward each other. Both the sleeve 9 and the bolt 15 cooperate with the jaws 1 and 2 to keep the jaws 1 and 2 aligned.

The bolt 15 has a rectangular head 16 thereon, the center of which is offset with respect to the axis of the bolt 15. The head 16 is received in a socket 18 provided at one end of a handle 17. The handle 17 rests normally on the curved top surface 1c of the jaw 1 and can be rotated to turn the bolt 15 and thread it into or out of the sleeve 9. As indicated in FIG. 1 downward pressure on the handle 17 in the direction of the arrow A will rock the handle 17 on the surface 1c and lift the bolt head 16 away from the jaw 1. Thus an operator can grasp the handle 17 and the extension 4 in his hand and apply pressure to grip an article between the jaws 1 and 2.

The handle 17 when rotated in the direction indicated in FIG. 3 moves the jaws 1 and 2 toward each other. By this rotation the jaws 1 and 2 can be used as a hand vise to hold an article wtihout any gripping of the handle 17 and extension 4 toward each other. In use of the tool as a hand grip tool to grip and turn an article, one spins the handle 17 on the jaw 1 to bring the jaws close to the article, then applies the final gripping pressure by squeezing the handle 17 toward the extensions. The movement of the jaws 1 and 2 toward each other by this squeezing action is very little for a substantial movement of the handle. A great leverage is thus obtained.

The form of the invention shown in FIGS. 5–8 functions in essentially the same manner as the form shown in FIGS. 1–4. In this form of the invention, however, the construction is such as to enable the jaws and their extensions to be stamped out and jaw liner inserts are used. The jaws 21 and 22 are channel-shaped in cross section and the end of the extended portion 23 of the jaw 21 nests within the extended portion 24 of the jaw 22. These extended portions are secured together by a pivot pin 25. The jaws have inserts 27 and 28 secured therein. The inserts are composed of resilient material such as rubber or a plastic that is tough and yet will not scar the surface of the item being gripped. This resilient material is secured in a cup 26 and each insert assembly is secured in the jaw by rivets 29.

The jaw 22 has pivoted therein a sleeve 30 which is internally threaded which is of rectangular exterior configuration when viewed endwise. This sleeve 30 has trunnions 31 and 32 which extend through apertures in the walls 22a and 22b of the jaw 22. A bolt 33 threads into the sleeve 30 and extends up through the top wall 21c of the jaw 21 between the side walls 21a and 21b of this jaw. The bolt has a head 34 which is non-rotatably seated in a socket 36 in one end of a handle 35. The socket end of the handle 35 rests on the wall 21c of the jaw 21 and can be rotated on the axis of the bolt 33 to turn the bolt and move the bolt endwise in the sleeve 30. A coiled spring 37 fits around the bolt 33 between the top of the sleeve 30 and the wall 21c of the jaw 21. This spring is under sufficient compression to always urge the jaw 21 against the under surface 35a of the handle 35.

As in the first form of the invention the handle 35 is rotated to cause the bolt to draw the jaws 21 and 22 toward each other against an item between the jaws. To apply strong gripping pressure by the jaws on the item the handle 35 is moved toward the jaw extension 23 so as to urge the bolt head 34 away from the top wall 21c of the jaw 21.

The bolt 34 and the sleeve 30 are so proportioned that the jaws 21 and 22 can be brought together before the lower end of the bolt 34 engages the bottom wall 22c of the jaw 22. The surfaces of the inserts 27 and 28 can be made of any desired contour to best fit the items to be gripped thereby. They are shown as provided with small crossing diagonal grooves.

Having described a preferred form of my invention, I seek to obtain Letters Patent upon my invention which I define as follows:

1. A hand tool usable to grip items by hand action and further usable as a hand vise comprising:
    two jaws having opposed gripping surfaces;
    extensions on said jaws hinged to each other at a point remote from the jaws;
    resilient means between the jaws urging them apart;
    an interiorly threaded sleeve seated in one jaw and held therein against rotation on its own axis;
    a bolt having one end threaded into said sleeve and extending through the other jaw and rotatable in said other jaw and having a head thereon;
    a handle having a portion mounted on the bolt between the bolt head and the adjacent surface of said other jaw operable upon movement of the handle toward said extensions to rock on the said surface and cause limited movement of the head away from said surface; and
    said handle being non-rotatable on the bolt whereby rotation of the handle about the bolt axis effects threading of the bolt into and out of the sleeve.

2. The tool defined in claim 1 wherein the sleeve and is recessed to receive the bolt head.

3. The tool defined in claim 1 wherein the sleeve and bolt are mounted for limited rocking movement lengthwise of the jaws to accommodate the movement of the jaws toward and away from each other.

4. The tool defined in claim 1 wherein said sleeve includes trunnions rockably seated in said first jaw.

5. The tool defined in claim 1 wherein the sleeve projects beyond the first jaw toward the other jaw and the other jaw is recessed to provide a portion fitting the projecting part of the sleeve and a smaller aperture portion fitting the bolt.

6. The tool defined in claim 1 wherein the jaws and their extensions are channel-shaped in cross section.

7. The tool defined in claim 1 wherein the jaws are channel-shaped in cross section and gripping inserts of resilient material are secured in the channels for engaging the items to be gripped.

8. The tool defined in claim 1 wherein the jaw which seats the sleeve is channel-shaped and the sleeve has trunnions extending through the channel side walls to pivot the sleeve.

References Cited
UNITED STATES PATENTS

| | | | |
|---|---|---|---|
| 232,959 | 10/1880 | Hall et al. | 269—161 |
| 299,889 | 6/1884 | Whiting | 269—161 |
| 639,812 | 12/1889 | Jensen | 81—384 |
| 788,161 | 4/1905 | Marceau | 269—239 X |
| 2,749,787 | 6/1956 | Ollagnon | 81—330 |

THERON E. CONDON, Primary Examiner

R. V. PARKER, Jr., Assistant Examiner

U.S. Cl. X.R.

81—384; 269—161, 6